(12) United States Patent
Feng et al.

(10) Patent No.: US 11,951,651 B2
(45) Date of Patent: Apr. 9, 2024

(54) INTELLIGENT 3D PRINTING METHOD FOR LARGE 3D DEEP COMPLEX ENGINEERING GEOLOGICAL MODEL

(71) Applicant: Northeastern University, Shenyang (CN)

(72) Inventors: Xiating Feng, Shenyang (CN); Zhengwei Li, Shenyang (CN); Shiming Mei, Shenyang (CN); Yanhua Gong, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 318 days.

(21) Appl. No.: 17/599,867

(22) PCT Filed: Nov. 16, 2020

(86) PCT No.: PCT/CN2020/128910
§ 371 (c)(1),
(2) Date: Sep. 29, 2021

(87) PCT Pub. No.: WO2022/095103
PCT Pub. Date: May 12, 2022

(65) Prior Publication Data
US 2022/0288812 A1  Sep. 15, 2022

(30) Foreign Application Priority Data

Nov. 4, 2020  (CN) .......................... 202011216339.7

(51) Int. Cl.
*B28B 1/00* (2006.01)
*B28B 17/00* (2006.01)
(Continued)

(52) U.S. Cl.
CPC .......... *B28B 1/001* (2013.01); *B28B 17/0081* (2013.01); *B33Y 10/00* (2014.12); *B33Y 50/02* (2014.12)

(58) Field of Classification Search
CPC ......... B33Y 10/00; B33Y 30/00; B33Y 50/02; B33Y 80/00; B28B 1/001; B28B 17/0081;
(Continued)

(56) References Cited

U.S. PATENT DOCUMENTS

2019/0204191 A1\* 7/2019 Li .......................... B33Y 10/00

FOREIGN PATENT DOCUMENTS

CN  204844404 U  12/2015
CN  107063790 A  8/2017
(Continued)

*Primary Examiner* — Jerzi H Moreno Hernandez
(74) *Attorney, Agent, or Firm* — Muncy, Geissler, Olds & Lowe, P.C.

(57) ABSTRACT

Provided is an intelligent 3D printing method for a large 3D deep complex engineering geological model, including the steps of firstly, determining physical and mechanical parameters of the similar materials of the intact rock mass and the rock mass structure, and selecting a cementing agent; performing a small-scale 3D printing test at different material ratios and 3D printing parameters; determining the 3D printing similar material ratios and the 3D printing parameters; establishing a 3D digital model, planning printing paths, and determining pore diameters, number and combination form of the print heads; conveying the similar materials to the print heads; under the control of a 3D printing intelligent coupling control system, running each print head according to the planned and generated printing paths to complete printing; and finally, testing a printing effect of the model.

3 Claims, 10 Drawing Sheets (51) Int. Cl.
*B33Y 10/00* (2015.01)
*B33Y 50/02* (2015.01)

(58) Field of Classification Search
CPC .. B28B 17/0063; B28B 17/0072; B29C 64/10
See application file for complete search history.

(56) References Cited

FOREIGN PATENT DOCUMENTS

| | | | |
|---|---|---|---|
| CN | 108252336 A | | 7/2018 |
| CN | 108638289 A | | 10/2018 |
| CN | 109470501 A | * | 3/2019 |
| CN | 109470501 A | | 3/2019 |
| CN | 109883785 A | * | 6/2019 |
| CN | 110398400 A | * | 11/2019 |
| CN | 110398400 A | | 11/2019 |
| JP | 2000000811 A | | 1/2000 |

* cited by examiner

INTELLIGENT 3D PRINTING METHOD FOR LARGE 3D DEEP COMPLEX ENGINEERING GEOLOGICAL MODEL

BACKGROUND OF THE INVENTION

1. Field of the Invention

The invention relates to the technical field of deep underground engineering and science, in particular to an intelligent 3D printing method for a large 3D deep complex engineering geological model.

2. The Prior Arts

With continuous deep development of underground engineering construction and energy and resources around the world, and continuous increase of a project scale, the geological conditions that the engineering construction and operation face are increasingly complicated, and consequently, various engineering geological disasters frequently occur, which severely threaten personnel and equipment safety and construction schedule.

A geological model test method is a scale reduction test taken for a project development process in a laboratory to reproduce the occurrence process of the engineering geological disasters; by adopting multi-information monitoring methods, the deformation and fracture evolution process of complex rock structures affected by human engineering can be simulated more comprehensively, and further, the development and occurrence mechanisms of the engineering geological disasters are effectively disclosed; and the geological model test method is an important means for research on deep underground engineering and science problems.

The geological model test is successfully developed on the basis of accurate manufacturing of a geological model, and the key is to reasonably generalize complex engineering geological conditions on site into an indoor geological model. At present, a large geological model is manufactured mainly by using manual manufacturing methods, such as a pouring method, a layered tamping method and a block stacking method. In practical engineering, most geological masses have different types of rock mass structure planes in different sizes, such as fault, fold, joint and fracture; however, the traditional model manufacturing method can only be used for preparing models of simple geological conditions, such as homogeneous or layered strata, and cannot meet the actual requirements for accurate manufacturing of the deep complex engineering geological model.

In recent years, the 3D printing technology is developed so that manufacturing of a complex structure 3D model is achieved. 3D printing is a technology for constructing a 3D entity by applying discrete materials (filament, liquid, powder, etc.) with a layer-by-layer stacking accumulation method based on digital model files. At present, processes commonly used for 3D molding of the geological masses mainly include powder bonding molding, stereo lithography apparatus and fused deposition modeling. The three printing technologies provide new ideas for manufacturing the complex geological model, but cannot be compatible with geotechnical similar materials consisting of aggregate, cementing agents, water and the like, and cannot be applicable for 3D molding of the large geological model. For example, Patent publication No. CN 110398400 A relates to a 3D printing reconstruction method for a fractured rock mass and the fractured rock mass, only 3D printing of cylindrical samples is achieved, and samples are small in size (centimeter-level). In addition, the method results in essential difference between the mechanical properties of the samples and those of rocks or rock masses, which is not because the geotechnical similar materials are used in the method. Patent publication No. CN108638289A relates to a 3D molding system for a large complex geological physical model, and designs a 3D molding machine for the large complex geological physical model, but does not relate to a 3D precise printing process and method for the complex engineering geological model. In conclusion, in the aspect of 3D printing of the large 3D deep complex engineering geological model: (1) a preparation method for similar materials of the geological model based on a 3D printing technology is not provided, especially for mechanical properties, such as high strength and brittleness and brittle-ductile transition, of the deep engineering rock masses and requirements of the 3D molding process for material properties. The influence of printing parameters on the physical and mechanical properties of the materials after molding is not studied, and control of the 3D molding process over the model performance cannot be evaluated. (2) An intelligent control method for the 3D printing process is not provided, and the flow rate of the similar materials, the traveling speed of print heads, the temperature of a feeding system and the like cannot be controlled accurately. The cooperative work of multiple print heads, intelligent planning of a printing path, precise synchronous pre-burying of sensing equipment are not involved, and consequently precise 3D printing of a complex rock mass structure of the large geological model cannot be achieved. (3) A systematic testing and evaluation method for the large 3D printing geologic model is not provided, and testing, evaluation and the like of the printing effect of a model interior structure, and the physical and mechanical properties of the printed model body cannot be completed.

SUMMARY OF THE INVENTION

To solve the technical problem, in view of the shortcomings in the prior art, the present invention provides an intelligent 3D printing method for a 3D deep complex engineering geological model. Proper printing materials are selected according to physical and mechanical properties of original rocks and rock mass structures, and 3D accurate manufacturing of the large 3D deep complex engineering geological model is achieved through layer-by-layer extrusion deposition molding of print heads.

In order to solve the technical problem, in the embodiment, the intelligent 3D printing method for the large 3D deep complex engineering geological model comprises: a preparation for similar materials of the geological model, a model 3D printing and a testing for a model printing effect.

The preparation for the similar materials of the geological model comprises:

Step 1: collecting samples of an intact rock mass and a rock mass structure on an engineering site according to an engineering background, and performing indoor tests to obtain component information, physical parameters and mechanical parameters of the intact rock mass and the rock mass structure respectively.

Step 2: determining an aggregate type and a particle size range of the similar materials for preparing the intact rock mass and the rock mass structure according to the obtained component information of the intact rock mass and the rock mass structure.

Step 3: determining a geometric similarity ratio, a physical similarity ratio and a mechanical similarity ratio between an engineering prototype and an indoor model based on a similarity theory, thereby calculating the physical and mechanical parameters of the similar materials of the intact rock mass and the rock mass structure, and selecting a type of cementing agents.

Step 4: achieving a control over the printing performance of the similar materials of the rock mass and the rock mass structure by adding additives, so that the similar materials of the rock mass and the rock mass structure have a reasonable initial setting time, a flow performance and a self-holding capacity.

Step 5: performing a small-scale 3D printing test at different material ratios and 3D printing parameters according to a uniform design or orthogonal design test method, performing test on physical and mechanical properties for printed similar material geologic model samples, and judging whether the printed similar material geologic model samples meet the preset physical and mechanical parameter indexes or not; if yes, performing Step 6; or else, resetting the material ratios and the 3D printing parameters, and performing the small-scale 3D printing test, till the printed similar material geologic model samples meet the preset physical and mechanical parameter indexes.

Step 6: determining the 3D printing similar material ratios and the 3D printing parameters of the intact rock mass and the rock mass structure meeting the preset physical and mechanical parameter indexes.

The model 3D printing comprises:

Step S1: establishing 3D digital models of the intact rock mass and the rock mass structure according to the geological conditions of engineering rock masses respectively.

Step S2: determining the printing parameters of the intact rock mass and the rock mass structure respectively, and planning printing paths respectively.

Step S3: planning and generating complete printing paths of the 3D digital model of the intact rock mass and the rock mass structure to achieve a matching between the printing path of the intact rock mass and the printing path of the rock mass structure, and automatically reserving embedding positions of multi-information monitoring sensors.

Further dividing a single-layer printing area of the geologic model into an intact rock mass area, a rock mass structure area, a sensor pre-burying area and a boundary transition area of which printing paths are connected with one another according to the 3D digital model of the intact rock mass and the rock mass structure, and setting different printing parameters for subareas, wherein layer heights of the intact rock mass area and the rock mass structure area are in an integer multiple relation; automatically adjusting a line width of each of the subareas according to geometric dimensions of the printing area, so that the printing area is an integer multiple of the line width in dimension; enabling the planned printing paths to be automatically generated in parallel with a long axis of the rock mass structure area; performing a self-adaptive adjusting on the printing parameters of the boundary transition area; automatically reserving a sensor pre-burying position in the 3D digital model of the intact rock mass and the rock mass structure in the sensor pre-burying area during the planning of the printing paths; and when the printing reaches the position, performing the self-adaptive adjusting on a discharging speed and the traveling speed of the print heads.

Step S4: determining pore diameters, number and combination form of print heads according to information of the generated printing path and structural complexity and accuracy requirements of the 3D digital model of the intact rock mass and the rock mass structure.

Step S5: stirring, mixing and filtering the similar materials of the intact rock mass and the rock mass structure in an independent stock bin, and conveying the similar materials to the print heads through a pumping device; under the control of a 3D printing intelligent coupling control system, running each of the print heads according to the planned and generated printing paths based on Step 3 to complete the printing.

The 3D printing intelligent coupling control system controls the print heads for 3D printing to achieve servo intelligent control over a flow rate of the similar materials, an intelligent matching between a traveling speed of the print heads and the flow rate of the similar materials, and a temperature self-adaptive adjustment of a feeding system, and controls a cooperative work of the print heads to complete the printing of a model body jointly.

The servo intelligent control over the flow rate of the similar materials refers to that the 3D printing intelligent coupling control system obtains real-time flow state information of the similar materials in a conveying pipeline connected with the print heads through a pipeline pressure sensor and a similar material flow rate sensor; when a deviation between a monitoring value and a setting value of a current printing path is greater than a setting threshold, the 3D printing intelligent coupling control system actively adjusts a feeding speed of the feeding system.

The intelligent matching between the traveling speed of the print heads and the flow rate of the similar materials refers to that the 3D printing intelligent coupling control system monitors and controls a rotational speed of a print head motor to achieve autonomous adjustment of the traveling speed of the print heads in XYZ directions, so that the traveling speed of the print heads and the discharging speed of the similar materials are within a preset matching interval.

The temperature self-adaptive adjustment of the feeding system refers to that the 3D printing intelligent coupling control system monitors a temperature of the feeding system of a 3D printer through distributed temperature sensors, when the temperature of the feeding system exceeds a setting value and reaches an adjusting threshold, a temperature control system is started autonomously for cooling the feeding system; when the temperature of the feeding system is reduced to the setting value, the temperature control system stops working; when the temperature of the feeding system is lower than a setting value and reaches an adjusting threshold, the temperature control system is autonomously started for heating the feeding system; when the temperature of the feeding system is increased to the setting value, the temperature control system stops working.

The cooperative work of the print heads refers to that different types of print heads with different pore diameters are selected for printing different subareas of the 3D digital model of the intact rock mass and the rock mass structure; each of the print heads is provided with an independent feeding and print head running control system; and the independent print heads cooperatively work according to the intelligently planned printing paths to complete overall printing of the model body.

The testing for the model printing effect comprises:

(1) Locating periphery boundaries of each printing layer, the rock mass structure and positions of sensors through a laser in the model 3D printing, and achieving real-time monitoring of the boundaries of the printing layers, the rock mass structure and the positions of the sensors in the model 3D printing.

(2) After the printing of a geologic model body, arranging a plurality of vertical micro boreholes and transverse micro boreholes in a vertical direction and a transverse direction of the geologic model body, and performing endoscopy by using an endoscope to test the printing effect of the structure at a designated position, so that the test of spatial positions of interior structures of the geologic model body is completed.

(3) After the printing of the geologic model body, taking rock mass and rock mass structure samples in different positions of the geologic model body in different directions, and performing tests on physical and mechanical properties to test whether relevant properties reach preset parameter indexes or not.

According to the intelligent 3D printing method for the large 3D deep complex engineering geological model, 3D accurate manufacturing of the large 3D deep complex engineering geological model can be achieved, and the physical and mechanical parameters, such as porosity, strength, deformation, brittleness and ductility, and properties of the model body are adjustable and controllable. The 3D printing intelligent coupling control system is provided, so that the self-adaptive adjustment of the flow rate of the similar materials, the traveling speed of the print heads and the temperature of the feeding system can be achieved to complete 3D precise printing manufacturing of the internal complex rock mass structure of the model. The functions of cooperative work of multiple print heads, intelligent planning of the printing paths, and precise synchronous pre-burying of the sensing equipment are achieved. Meanwhile, a systematic testing and evaluation method for the printing effect of an internal structure surface of the model, and the physical and mechanical properties of a complete rock mass and various rock mass structures is established.

According to the intelligent 3D printing method for the 3D deep complex engineering geological model, the preparation of the similar materials of the geological model applicable for the 3D printing technology can be achieved, and the influences of the printing parameters (layer height, line width, included angle between layer lines and the like) on the properties of the model are considered; various physical and mechanics parameters, such as expected porosity, strength, modulus of elasticity and brittleness index, of the printing model can be achieved. The intelligent planning function of the printing path is provided, and the printing process is controlled and completed through the 3D printing intelligent coupled control system; the creative functions of servo intelligent control over the flow rate of the similar materials, adaptive adjustment of the traveling speed and temperature of the print heads, cooperative work of the print heads, precise synchronous pre-burying of sensors and the like can be achieved. Comprehensive testing and evaluation of the printing effect of the internal structure of the model body, and the physical and mechanical properties of the complete rock mass and various rock mass structures can be achieved.

DETAILED DESCRIPTION OF THE PREFERRED EMBODIMENT

The specific implementations of the invention are described in more detail below with reference to the accompanying drawings and embodiments. The following embodiments are intended to illustrate the invention, rather than to limit the scope of the invention.

In the embodiment, by taking a certain deep underground laboratory as engineering background, intact marble samples and samples of rock mass structures, such as faults, are collected on site, and the engineering geological model is printed with the intelligent 3D printing method of the large 3D deep complex engineering geological model.

Figure 1A:
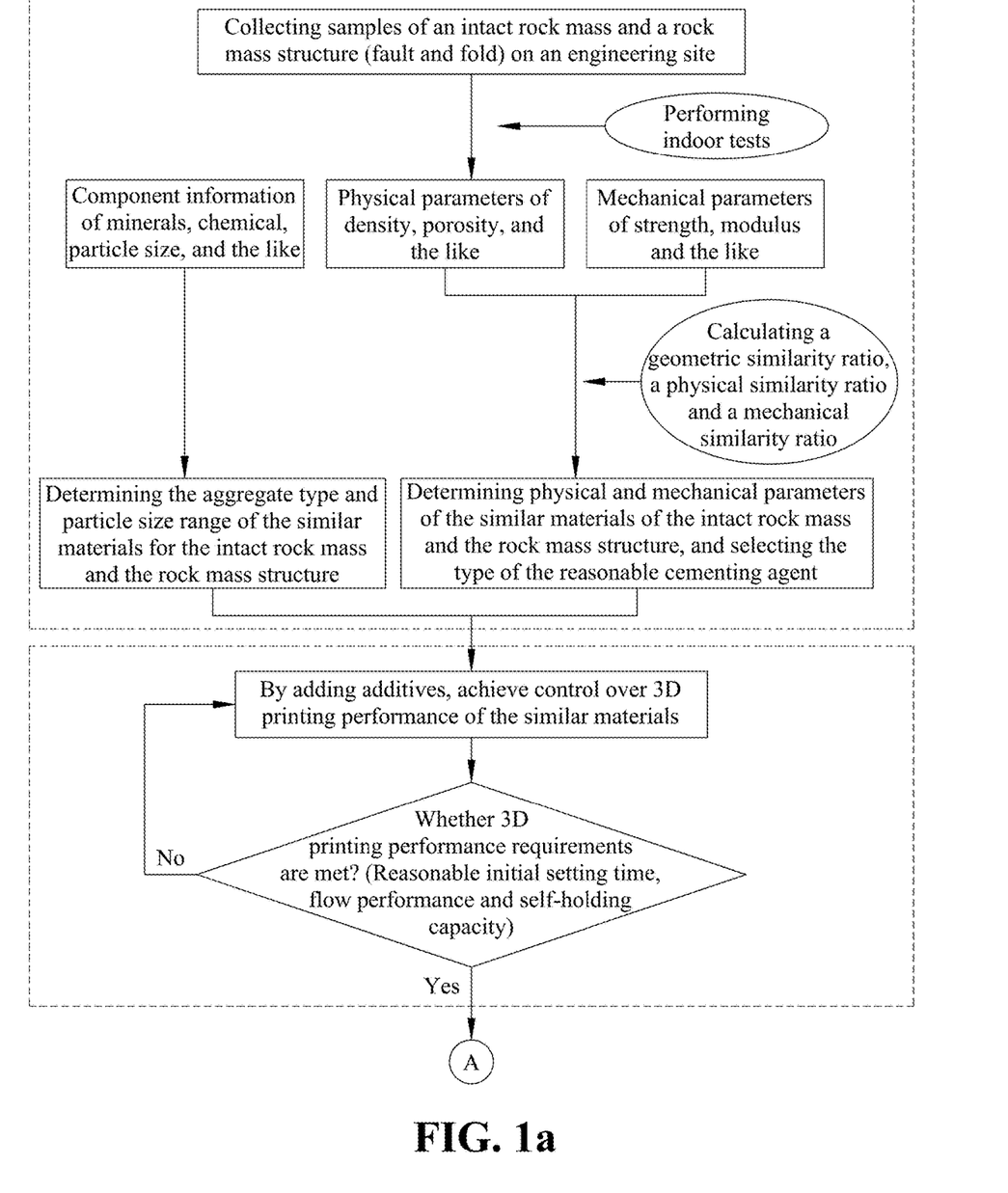
FIGS. 1a and 1b together show a flow chart of a preparation process for similar materials of a geologic model provided by the embodiment of the invention.
Figure 1B:
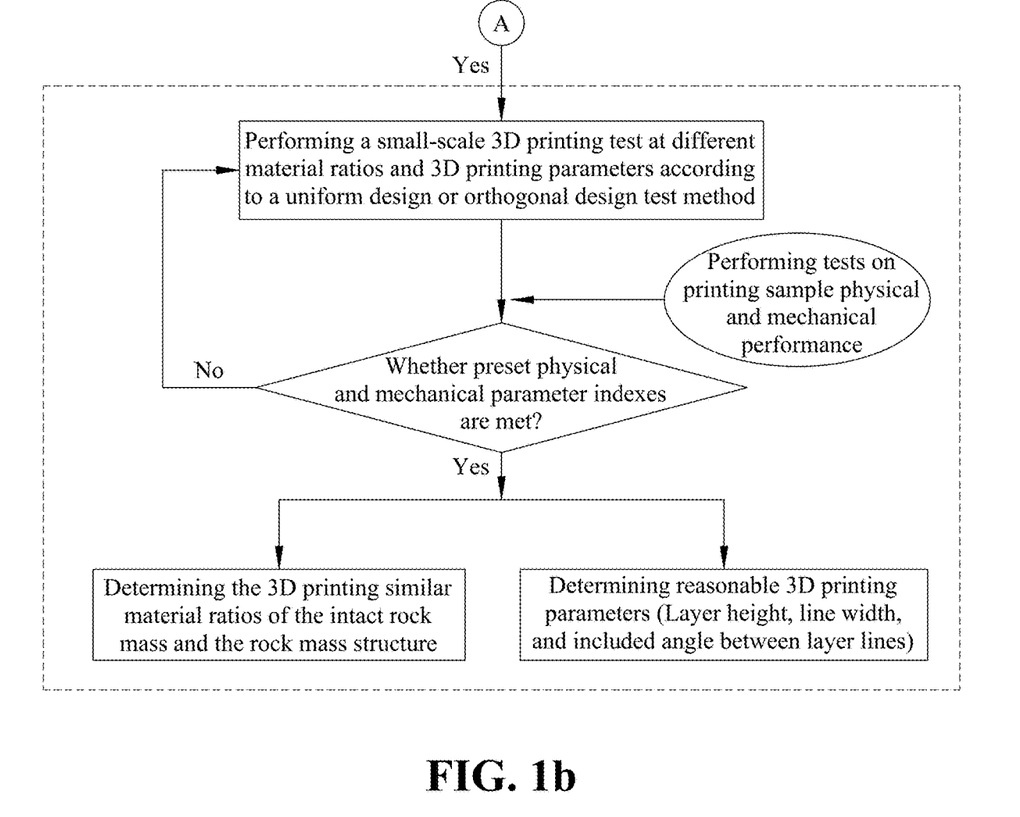

In the embodiment, the intelligent 3D printing method for the large 3D deep complex engineering geological model comprises three parts, namely a preparation for similar materials of the geological model, a model 3D printing and a testing for a model printing effect, wherein the preparation for the similar materials of the geological model is shown as FIGS. 1a and 1b, and specifically comprises:

Step 1: collecting samples of an intact rock mass and a rock mass structure (fault and fold) on an engineering site according to an engineering background, and performing indoor tests to obtain component information (mineral components, compound type and particle size), physical parameters (density and porosity) and mechanical parameters (strength, modulus of elasticity, cohesive force and internal friction angle) of the intact rock mass and the rock mass structure respectively.

Step 2: determining an aggregate type and a particle size range of the similar materials for preparing the intact rock mass and the rock mass structure according to the obtained component information of the intact rock mass and the rock mass structure.

Step 3: determining a geometric similarity ratio, a physical similarity ratio and a mechanical similarity ratio between an engineering prototype and an indoor model based on a similarity theory, thereby calculating the physical and mechanical parameters of the similar materials of the intact rock mass and the rock mass structure, and selecting a type of a cementing agent.

Figure 2A:
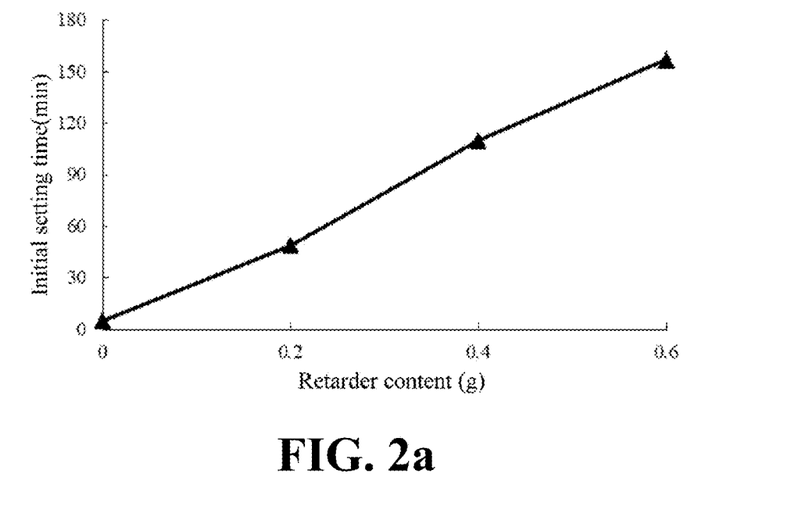
FIG. 2a is a diagram of influence of additives obtained after testing on the initial setting time of the similar materials provided by the embodiment of the invention.
Figure 2B:
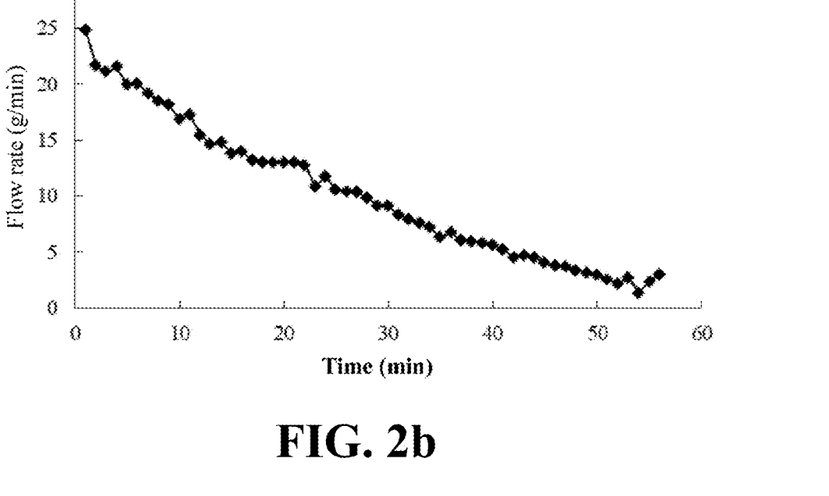
FIG. 2b is a diagram of influence of additives obtained after testing on the flow rate of the similar materials provided by the embodiment of the invention.

In the embodiment, the intact marble samples and the samples of the rock mass structures, such as faults, are collected on site, and tested for preparing the 3D printing similar materials. In the embodiment, the description is given by taking the preparation method for the 3D printing similar materials of the intact marble samples as an example; the test result shows that main minerals of the intact marble samples include dolomite and calcite, and main compounds include magnesium oxide, calcium oxide and silicon dioxide;

the average particle size is 72 μm, and the density is 2.8 g/cm$^3$; the uniaxial compressive strength is 190 MPa, and the modulus of elasticity is 60 GPa; based on the measured component information of minerals, chemical, particle size and the like, it is determined that the marble aggregates include 380 μm calcite sand, 150 μm dolomite sand and 45 μm calcite powder; based on a similarity theory, and in view of proportional relation between a site cavity size and an actual simulated cavity size, it is determined that the geometric similarity ratio is 1:35; the density of the similar materials is kept consistent with that of original rocks, and is 2.8 g/cm$^3$, so that the mechanical similarity ratio is also 1:35. Accordingly, the physical and mechanical parameters of the similar materials of the intact rocks in the geologic model to be printed can be calculated, namely that the uniaxial compressive strength is 5.4 MPa, and the modulus of elasticity is 1.7 GPa; besides, semi-hydrated gypsum and portland cement are selected as a cementing agent. Sodium gluconate is selected as a retarder, and hydroxypropyl methyl cellulose is selected as a water-retaining agent; the initial setting time and flow rate evolution under the condition of different additive amounts are tested, and the printing performance of the similar materials is controlled, so that the materials have a reasonable initial setting time, a flow performance and a self-holding capacity, and at room temperature (20° C.), the variation tendency of the amount of the retarder added and the initial setting time thereof in 500 g of the similar materials, and at room temperature (20° C.), the variation tendency of the flow rate of 500 g of the similar materials with 0.4 g of the retarder and 0.8 g of the water-retaining agent added are shown in FIGS. 2a and 2b.

Step 4: achieving a control over the printing performance of the similar materials of the rock mass and the rock mass structure by adding additives, so that the similar materials of the rock mass and the rock mass structure have a reasonable initial setting time, a flow performance and a self-holding capacity.

The reasonable initial setting time refers to that the similar materials of the rock masses and structures are not cured too early, resulting in blockage of a conveying pipeline, or not cured for a long time in the printing process, and consequently, the printing model at the bottom layer fails to support the increasing weight of the upper layer, resulting in deformation of the model due to the dead weight; the flow performance refers to that the similar materials of the rock masses and structures are kept at a stable extrusion rate under a certain driving pressure, and besides, have no bleeding phenomenon of solid-liquid separation to ensure that the materials can be continuously extruded and stacked for molding. The self-holding capacity refers to the capacity that the materials can be kept in shape after extrusion and bear the increasing weight of the upper layer.

Step 5: performing a small-scale 3D printing test at different material ratios (aggregates and cementing agents) and 3D printing parameters (layer height, line width, included angle between layer lines, etc.) according to a uniform design or orthogonal design test method, performing tests on physical and mechanical properties for printed similar material geologic model samples, and judging whether the printed similar material geologic model samples meet the preset physical and mechanical parameters or not; if yes, performing Step 6; or else resetting the material ratios and the 3D printing parameters, and performing the small-scale 3D printing test, till the printed similar material geologic model samples meet the preset physical and mechanical parameters.

Step 6: determining the 3D printing similar material ratios and the 3D printing parameters of the intact rock mass and the rock mass structure meeting the preset physical and mechanical parameter indexes.

Figure 3A:
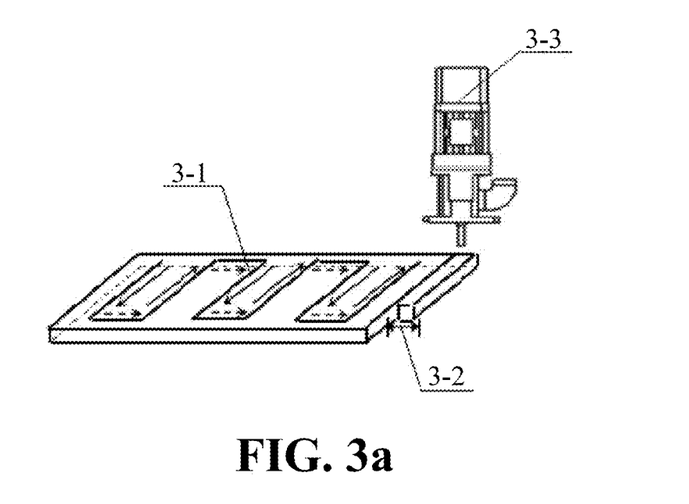
FIG. 3a is a schematic diagram of the 3D printing process and printing parameters provided by the embodiment of the invention, which shows a single-layer printing process.
Figure 3B:
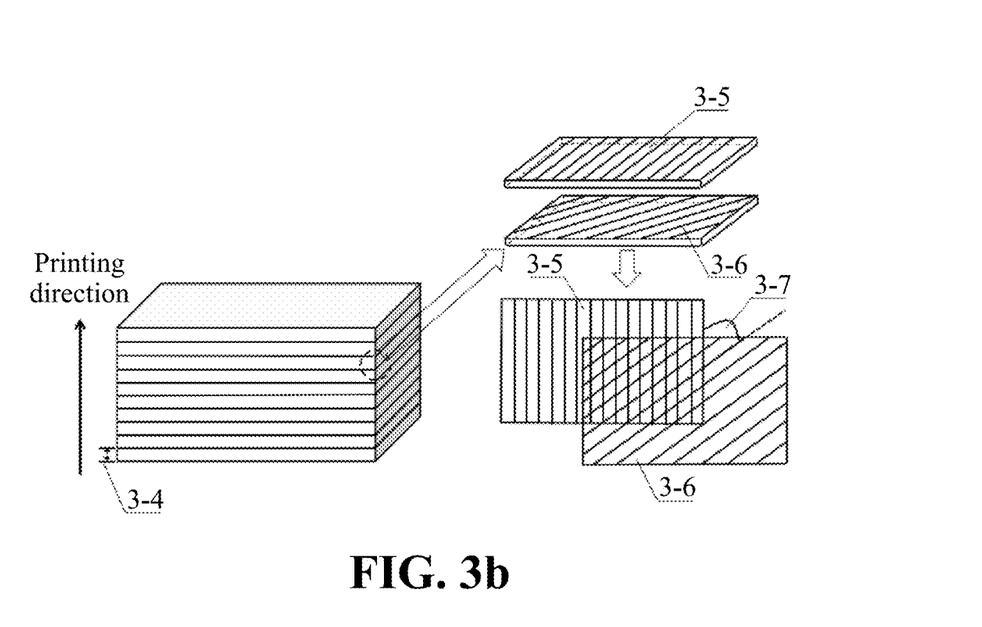
FIG. 3b is a schematic diagram of the 3D printing process and printing parameters provided by the embodiment of the invention, which shows a planning path of an upper and lower layer printing process.

In the embodiment, the small-scale 3D printing test is performed at different material ratios and printing parameters according to a uniform design method, and the control parameters include: the ratio of the aggregates to the cementing agent, the ratio of the gypsum to the cement, the ratio of the layer height to a sample height, the ratio of the line width to a sample width, an included angle between layer printing lines and the like; the printing parameters (layer height, line width, included angle between layer lines and the like) are shown in FIGS. 3a and 3b, and the uniform design test scheme is shown in Table 1. The tests on the physical and mechanical properties are performed for the printed similar material samples to judge whether the printed similar material samples meet the preset physical and mechanical parameters or not. The material ratios and the printing parameters are readjusted and tested if the printed similar material samples do not meet the preset physical and mechanical parameters. The 3D printing similar material ratios and reasonable 3D printing parameters of the intact rock masses meeting the preset physical and mechanical parameters are determined if the printed similar material samples meet the preset physical and mechanical parameters. The preparation process of the similar materials of the rock mass structures, such as fault and fold, are the same as those of the intact rock mass.

TABLE 1

Uniform design test scheme of different material ratios and printing parameters

| No. | Gypsum: cement | (Calcite sand + dolomite sand): (cement + gypsum) | Layer height: sample height | Line width: sample width | Included angle between layer lines (°) |
|---|---|---|---|---|---|
| 1 | 1.155 | 2.13 | 0.015 | 0.030 | 72 |
| 2 | 1.193 | 2.38 | 0.021 | 0.046 | 48 |
| 3 | 1.231 | 2.63 | 0.010 | 0.028 | 24 |
| 4 | 1.269 | 2.03 | 0.016 | 0.044 | 0 |
| 5 | 1.307 | 2.28 | 0.022 | 0.026 | 78 |
| 6 | 1.345 | 2.53 | 0.011 | 0.042 | 54 |
| 7 | 1.383 | 1.93 | 0.017 | 0.024 | 30 |
| 8 | 1.421 | 2.18 | 0.023 | 0.040 | 6 |
| 9 | 1.459 | 2.43 | 0.012 | 0.022 | 84 |
| 10 | 1.497 | 2.68 | 0.018 | 0.038 | 60 |
| 11 | 1.535 | 2.08 | 0.024 | 0.020 | 36 |
| 12 | 1.573 | 2.33 | 0.013 | 0.036 | 12 |
| 13 | 1.611 | 2.58 | 0.019 | 0.018 | 90 |
| 14 | 1.649 | 1.98 | 0.025 | 0.034 | 66 |

TABLE 1-continued

Uniform design test scheme of different material ratios and printing parameters

| No. | Gypsum: cement | (Calcite sand + dolomite sand): (cement + gypsum) | Layer height: sample height | Line width: sample width | Included angle between layer lines (°) |
|---|---|---|---|---|---|
| 15 | 1.687 | 2.23 | 0.014 | 0.016 | 42 |
| 16 | 1.725 | 2.48 | 0.020 | 0.032 | 18 |

Figure 4A:
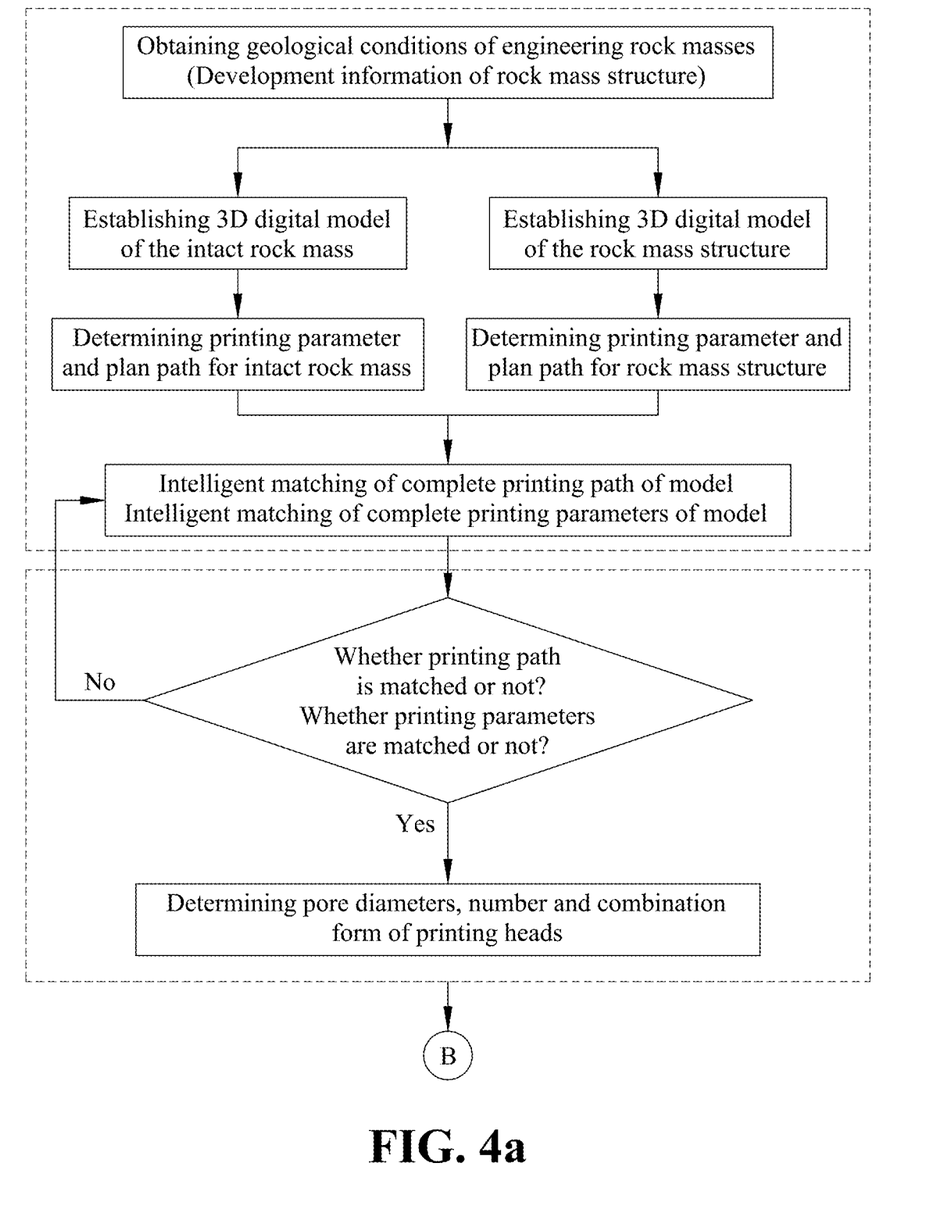
FIGS. 4a and 4b together show a flow chart of a model 3D printing provided by the embodiment of the invention.
Figure 4B:
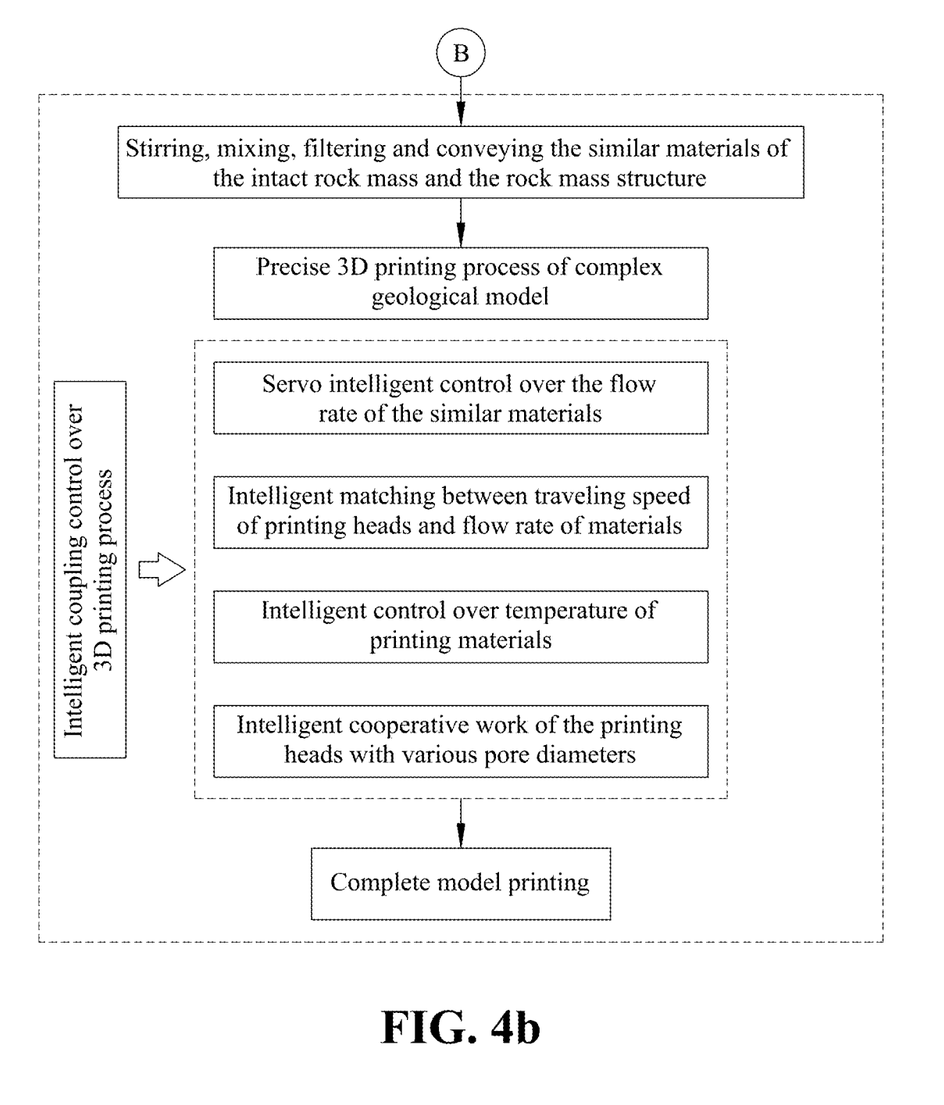

The model 3D printing is shown as FIGS. 4a and 4b, and specifically comprises:

Step S1: establishing a 3D digital model of the intact rock mass and the rock mass structure according to the geological conditions of engineering rock masses respectively.

Step S2: determining the printing parameters (layer height, line width, included angle between layer lines and the like) of the intact rock mass and the rock mass structure respectively, and planning the printing paths respectively;

Step S3: planning and generating complete printing paths of the 3D digital model of the intact rock mass and the rock mass structure to achieve a matching between the printing path of the intact rock mass and the printing path of the rock mass structure, and automatically reserving the embedding positions of multi-information monitoring sensors.

Figure 5:
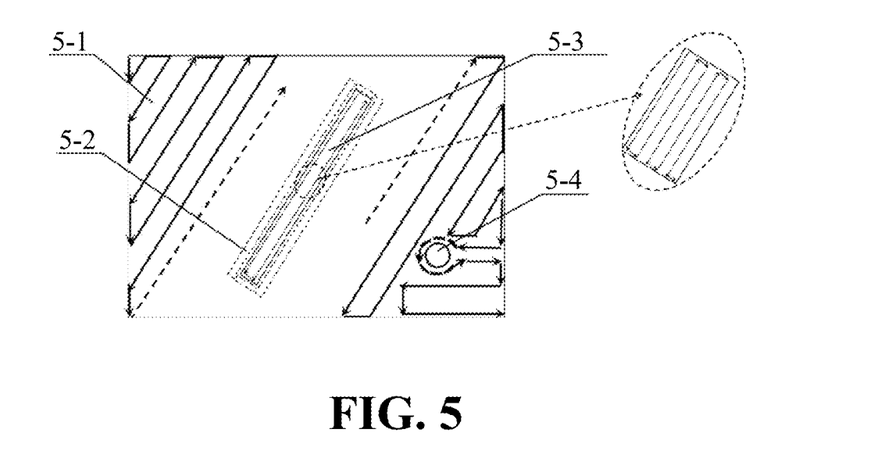
FIG. 5 is a schematic diagram of intelligent path planning principles of the 3D printing process provided by the embodiment of the invention.

Further dividing a single-layer printing area of the geologic model into an intact rock mass area 5-1, a rock mass structure area 5-3, a sensor pre-burying area 5-4 and a boundary transition area 5-2, which printing paths are connected with one another as shown in FIG. 5 according to the 3D digital models of the intact rock mass and the rock mass structure, and setting different printing parameters (line width, layer height, included angle between layer lines, traveling speed of print heads, discharging speed and the like) for the subareas, wherein the layer heights of the intact rock mass area and the rock mass structure area are in integer multiple relation, so that the printing layer heights can be matched; automatically adjusting the line width according to the geometric dimensions of the printing areas in the printing subareas, so that the dimensions of the printing areas are integer multiple of the line width; forming the planned printing paths in parallel with the long axis of the rock mass structure area automatically, keeping the linear path longest as far as possible, and reducing the number of "stops" of the print heads; and performing self-adaptive adjusting on the printing parameters of the boundary transition area to benefit rapid solidification molding, and increasing the temperature of the print heads to ensure the geometric accuracy and fusion effect of the interfaces of different printing areas. In addition, it is ensured that the paths among the subareas can be connected smoothly through intelligent planning of the paths, and the idle stroke and numbers of stops are reduced as far as possible to improve the molding accuracy and efficiency. A sensor pre-burying position is automatically reserved in the 3D digital model of the intact rock mass and the rock mass structure in a sensor pre-burying area during planning of the printing paths; and when the printing reaches this position, the self-adaptive adjusting is performed on the discharging speed and the traveling speed of the print heads to ensure the printing accuracy control of the reserved position.

Step S4: judging whether the planned and generated printing paths of the intact rock mass and the rock mass structure are matched or not, and whether the printing parameters are matched or not; if yes, determining pore diameters, number and combination form of the print heads according to information of the generated printing path and the complexity and accuracy requirements of the rock mass model structure; or else, replanning and generating the overall printing paths of the 3D digital models of the intact rock mass and the rock mass structure.

Step S5: stirring, mixing and filtering the similar materials of the intact rock mass and the rock mass structure in an independent stock bin, and conveying the similar materials to the print heads through a pumping device; under the control of a 3D printing intelligent coupling control system, running each of the print heads according to the planned generated printing paths based on Step 3 to complete printing.

Figure 6:
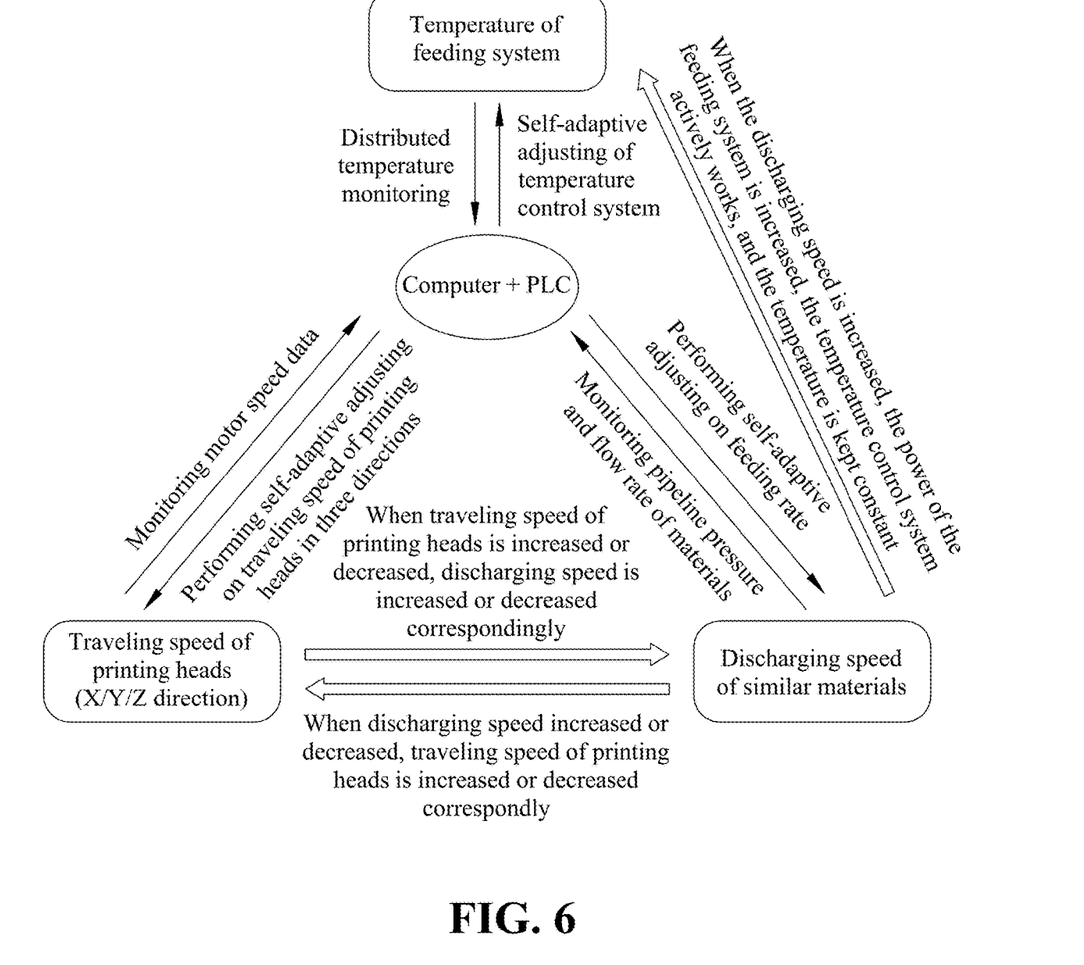
FIG. 6 is a schematic diagram of intelligent coupling control principles of the 3D printing process provided by the embodiment of the invention.
Figure 7:
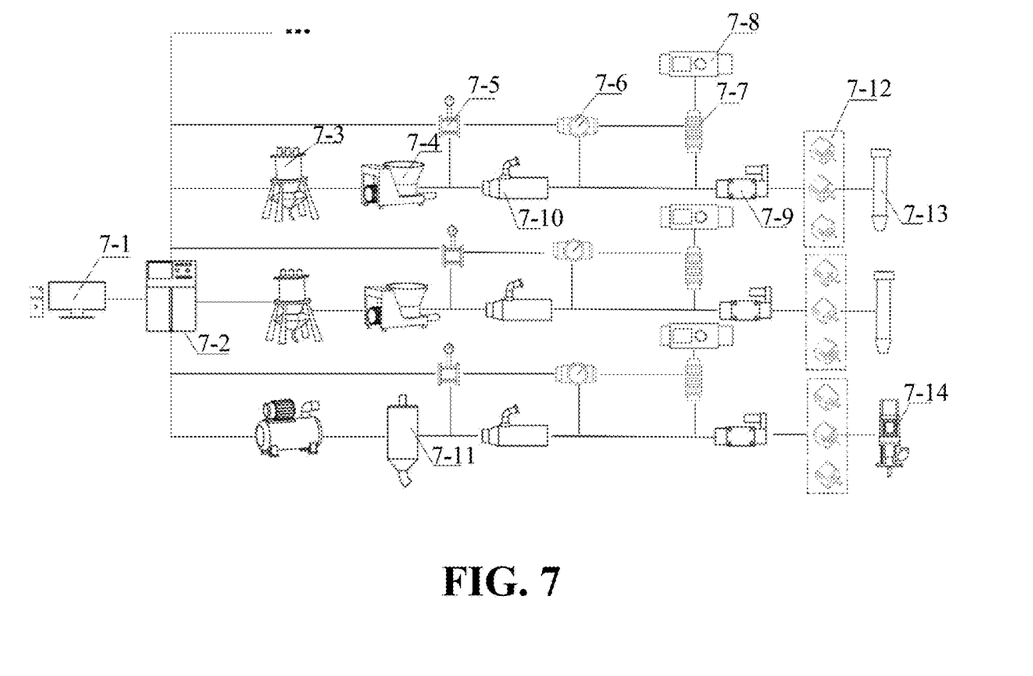
FIG. 7 is a schematic diagram of implementation principles of the 3D printing method for the large 3D deep complex engineering geological model.

The 3D printing intelligent coupling control system controls the print heads for 3D printing to achieve servo intelligent control over a flow rate of the similar materials, intelligent matching between a traveling speed of the print heads and the flow rate of the similar materials, and a temperature self-adaptive adjustment of a feeding system; besides, controls a cooperative work of the print heads to complete printing of a model body jointly, as shown in FIGS. 6 and 7.

The servo intelligent control over the flow rate of the similar materials refers to that the 3D printing intelligent coupling control system obtains real-time flow state information of the similar materials in a conveying pipeline connected with the print heads based on a computer 7-1 and a PLC 7-2 through a pipeline pressure sensor 7-5 and a similar material flow rate sensor 7-6; when a deviation between the monitoring value and the setting value of the current printing path is greater than a setting threshold, the 3D printing intelligent coupling control system actively adjusts the feeding speed of the feeding system, and specifically adjusts the rotational speed of a spraying machine to ensure that the flow rate fluctuation of the similar materials is within the upper and lower permissible range of the set value, so that the extrusion amounts of the materials are consistent, and a stable form can be kept to improve the printing accuracy.

The intelligent matching between the traveling speed of the print heads and the flow rate of the similar materials refers to that the 3D printing intelligent coupling control system monitors and controls the rotational speed of a print head motor 7-12 to achieve an autonomous adjustment of the traveling speed of the print heads in XYZ directions, and the traveling speed of the print heads and the discharging speed of the similar materials are within a preset matching interval; when the traveling speed of the print heads is increased or decreased, the discharging speed of the similar materials is also increased or decreased correspondingly. When the printing reaches the boundary of the model or the boundary position of the interior structure, the traveling speed of the print heads is decreased automatically; and the discharging speed of the similar materials is decreased through the system to avoid the "stockpiling" phenomenon. When the printing reaches the interior position of the model, the traveling speed of the print heads is increased automatically, and the discharging speed of the similar materials is increased automatically through the system; and the phenomenon of "lack of materials" is avoided while the printing efficiency is improved. In addition, when the discharging speed of the similar materials is changed, the traveling speed of the print heads is adjusted adaptively. If the discharging speed of the similar materials is decreased due to instability of the feeding system in the printing process, at the moment, the traveling speed of the print heads is decreased automatically through the system, and therefore, the phenomenon of "lack of materials" is avoided. When the discharging speed of the similar materials is increased, the system actively increases the traveling speed of the print heads, and therefore, the "stockpiling" phenomenon is avoided.

The temperature self-adaptive adjustment of the feeding system refers to that the 3D printing intelligent coupling control system monitors the temperature of the 3D printer feeding system through distributed temperature sensors 7-7; when the temperature of the feeding system exceeds the setting value and reaches the adjusting threshold, a temperature control device 7-8 is started automatically for cooling the feeding system; when the temperature of the feeding system is reduced to the setting value, the temperature control device 7-8 stops working; when environment temperature is too low, and consequently the temperature of the feeding system is lower than the setting value and reaches the adjusting threshold, the temperature control device 7-8 is autonomously started for heating the feeding system; when the temperature of the feeding system is increased to the setting value, the temperature control device 7-8 stops working. It is ensured that the whole feeding system and the similar materials are in a stable temperature interval, and the influences on the flow performance and setting time of the similar materials are reduced.

The cooperative work of the print heads refers to that different types of print heads 7-13 and 7-14 with different pore diameters are selected for different printing subareas of the 3D digital models of the intact rock mass and the rock mass structure. Each of the print heads is provided with an independent feeding and print head running control system; and the independent print heads cooperatively work according to the intelligently planned printing paths to complete overall printing of the model.

Figure 8A:
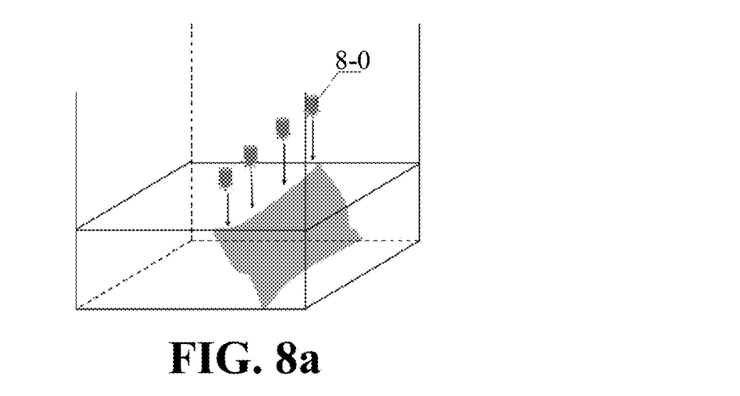
FIG. 8a is a schematic diagram of testing and evaluation of the printing effect of the geologic model provided by the embodiment of the invention, which shows the $n^{th}$ layer of the geologic model.
Figure 8B:
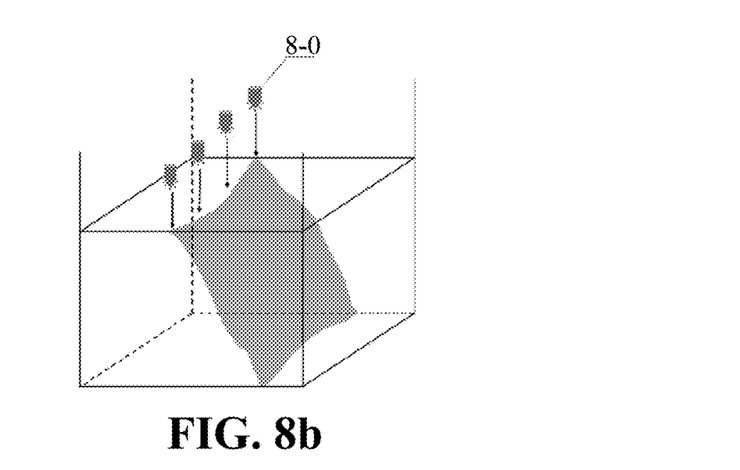
FIG. 8b is a schematic diagram of testing and evaluation of the printing effect of the geologic model provided by the embodiment of the invention, which shows the $(n+1)^{th}$ layer of the geologic model.
Figure 8C:
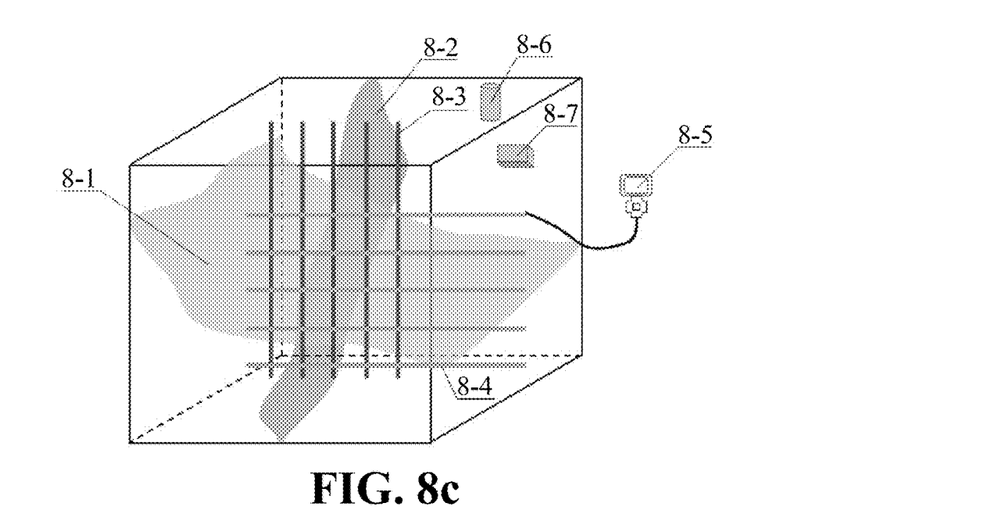
FIG. 8c is a schematic diagram of testing and evaluation of the printing effect of the geologic model provided by the embodiment of the invention, which shows the geologic model body.

The testing for the model printing effect specially comprises:

(1) Locating periphery boundaries of each printing layer, the rock mass structure and positions of sensors through a laser in the printing process, and achieving real-time monitoring of the boundaries of the printing layers, the rock mass structure and the positions of the sensors in the printing process, as shown in FIGS. 8*a* and 8*b*. (2) After the printing of the geologic model body, arranging a plurality of vertical micro boreholes 8-3 and transverse micro boreholes 8-4 (diameter 1 cm) in a vertical direction and a transverse direction of the geologic model as shown in FIG. 8*c*, and performing endoscopy by using an endoscope 8-5 to test the printing effect of the structure at a designated position, so that the test of spatial positions of the interior structures 8-1 and 8-2 of the geologic model body is completed. (3) After the printing of the geologic model body, taking cylindrical samples 8-6 with the geometric dimension of (φ50 mm×100 mm and cuboid samples 8-7 with the geometric dimension of 50 mm×50 mm×100 mm in different positions and directions of the geologic model as shown in FIG. 8*c*, testing physical and mechanical properties, and testing whether the relevant properties reach the preset parameters or not.

Finally, it should be noted that the above embodiments are merely intended to describe the technical solutions of the invention, rather than to limit the invention. Although the invention is described in detail with reference to the above embodiments, persons of ordinary skill in the art should understand that they may still make modifications to the technical solutions described in the above embodiments or make equivalent replacements to some or all technical features thereof, without enabling the essence of the technical solutions to depart from the scope defined by the claims of the invention.

What is claimed is:

1. A 3D printing method for a 3D underground complex engineering geological model, comprising:
   preparing materials of the geological model comprising:
      Step 1: collecting samples of an intact rock mass and a rock mass structure on an engineering site according to an engineering background, and performing indoor tests to obtain component information, physical parameters and mechanical parameters of the intact rock mass and the rock mass structure respectively;
      Step 2: determining an aggregate composition and a particle size range of the materials for preparing the intact rock mass and the rock mass structure according to the obtained component information of the intact rock mass and the rock mass structure;
      Step 3: determining a geometric similarity ratio, a physical similarity ratio and a mechanical similarity ratio between an engineering prototype and an indoor model based on a similarity theory, thereby calculating the physical and mechanical parameters of the materials of the intact rock mass and the rock mass structure, and selecting a composition of a cementing agent;
      Step 4: achieving a control over a printing performance of the materials of the rock mass and the rock mass structure by adding additives, so that the materials of the rock mass and the rock mass structure have a reasonable initial setting time, a flow performance and a self-holding capacity;
      Step 5: performing a small-scale 3D printing test at different material ratios and 3D printing parameters according to a uniform design or orthogonal design test method, performing test on physical and mechanical properties for printed material geologic model samples, and judging whether the printed material geologic model samples meet preset physical and mechanical parameter indexes or not; if yes, performing Step 6; or else, resetting the material ratios and the 3D printing parameters, and performing the small-scale 3D printing test, till the printed material geologic model samples meet the preset physical and mechanical parameter indexes; and
      Step 6: determining the 3D printing material ratios and the 3D printing parameters of the intact rock mass and the rock mass structure meeting the preset physical and mechanical parameter indexes;
   3D printing the geological model comprising:
      Step S1: establishing a 3D digital model of the intact rock mass and the rock mass structure according to geological conditions of engineering rock masses respectively;
      Step S2: determining the printing parameters of the intact rock mass and the rock mass structure respectively, and planning printing paths respectively;
      Step S3: planning and generating complete printing paths of the 3D digital model of the intact rock mass and the rock mass structure to achieve a matching between the printing path of the intact rock mass and the printing path of the rock mass structure, and automatically reserving embedding positions of multi-information monitoring sensors;

Step S4: determining pore diameters, number and combination form of print heads according to information of the generated printing path and structural complexity and accuracy requirements of the 3D digital model of the intact rock mass and the rock mass structure; and Step S5: stirring, mixing and filtering the materials of the intact rock mass and the rock mass structure in an independent stock bin, and conveying the materials to the print heads through a pumping device; under the control of a 3D printing coupling control system, running each of the print heads according to the planned and generated printing paths based on Step 3 to complete printing; wherein the 3D printing coupling control system controls the print heads for 3D printing to achieve a servo control over a flow rate of the materials, an matching between a traveling speed of the print heads and the flow rate of the materials, and a temperature self-adaptive adjustment of a feeding system, and controls a cooperative work of the print heads to complete 3D printing of the geological model; and testing the 3D printed geological model to determine a model printing effect comprising:

(1) locating periphery boundaries of each printing layer, the rock mass structure and positions of sensors through a laser in the 3D printed geological model, and achieving real-time monitoring of the boundaries of the printing layers, the rock mass structure and the positions of the sensors in the 3D printed geological model;

(2) after the 3D printing of the geological model, arranging a plurality of vertical micro boreholes in a vertical direction and a plurality of transverse micro boreholes in a transverse direction of the 3D printed geological model, and performing endoscopy by using an endoscope to test the printing effect of the structure at a designated position, so that the test of spatial positions of interior structures of the 3D printed geological model is completed; and (3) after the 3D printing of the geological model, taking rock mass and rock mass structure samples in different positions of the 3D printed geological model in different directions, and performing tests on physical and mechanical properties to test whether relevant properties reach preset parameter indexes or not.

2. The 3D printing method according to claim 1, wherein Step S3 further comprises:

dividing a single-layer printing area of the geological model into an intact rock mass area, a rock mass structure area, a sensor pre-burying area and a boundary transition area, which printing paths are connected with one another according to the 3D digital model of the intact rock mass and the rock mass structure, and setting different printing parameters for subareas, wherein a layer height of the intact rock mass area and a layer height of the rock mass structure area are in an integer multiple relation;

automatically adjusting a line width of each of the subareas according to geometric dimensions of the printing area, so that the printing area is an integer multiple of the line width in dimension;

enabling the planned printing paths to be automatically generated in parallel with a long axis of the rock mass structure area;

performing a self-adaptive adjusting on the printing parameters of the boundary transition area; and automatically reserving a sensor pre-burying position in the 3D digital model of the intact rock mass and the rock mass structure in the sensor pre-burying area during the planning of the printing paths;

wherein when the 3D printing reaches the sensor pre-burying position, performing the self-adaptive adjusting on a discharging speed and the traveling speed of the print heads.

3. The 3D printing method according to claim 1, wherein:

the servo control over the flow rate of the materials refers to that the 3D printing coupling control system obtains real-time flow state information of the materials in a conveying pipeline connected with the print heads through a pipeline pressure sensor and a material flow rate sensor; when a deviation between a monitoring value and a setting value of a current printing path is greater than a setting threshold, the 3D printing coupling control system actively adjusts a feeding speed of the feeding system; the matching between the traveling speed of the print heads and the flow rate of the materials refers to that the 3D printing coupling control system monitors and controls a rotational speed of a print head motor to achieve autonomous adjustment of the traveling speed of the print heads in XYZ directions, so that the traveling speed of the print heads and the discharging speed of the materials are within a preset matching interval; the temperature self-adaptive adjustment of the feeding system refers to that the 3D printing coupling control system monitors a temperature of the feeding system of a 3D printer through distributed temperature sensors, when the temperature of the feeding system exceeds a setting value and reaches an adjusting threshold, a temperature control system is started autonomously for cooling the feeding system; when the temperature of the feeding system is reduced to the setting value, the temperature control system stops working; when the temperature of the feeding system is lower than a setting value and reaches an adjusting threshold, the temperature control system is autonomously started for heating the feeding system; when the temperature of the feeding system is increased to the setting value, the temperature control system stops working; the cooperative work of the print heads refers to that different types of print heads with different pore diameters are selected for printing different subareas of the 3D digital model of the intact rock mass and the rock mass structure;

each of the print heads is provided with an independent feeding and print head running control system; and the independent print heads cooperatively work according to the planned printing paths to complete overall printing of the geological model.

\* \* \* \* \*